UNITED STATES PATENT OFFICE.

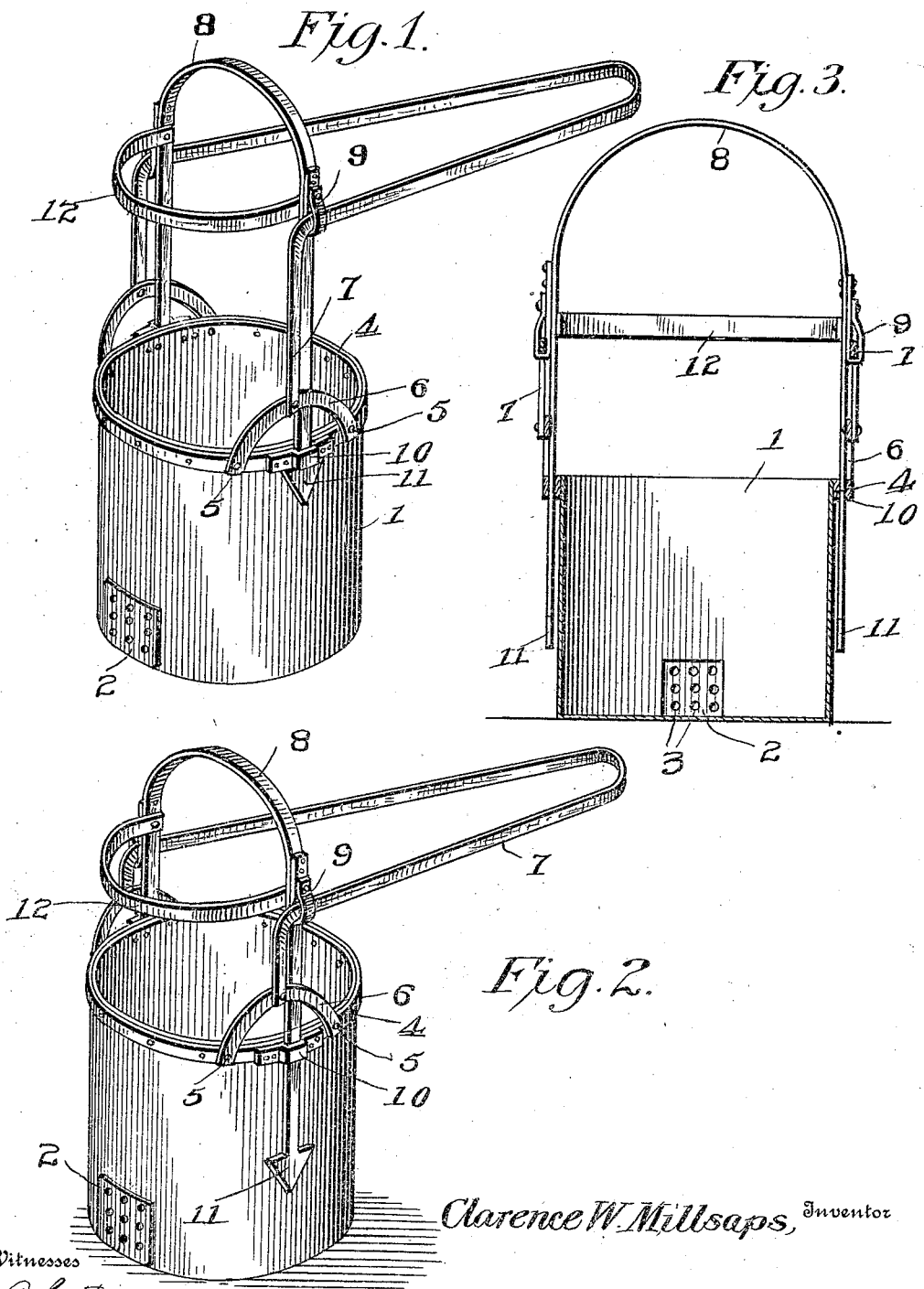

CLARENCE WILLIAM MILLSAPS, OF MILLSAPS, CALIFORNIA.

FEED-BAG FOR HORSES.

955,183.   Specification of Letters Patent.   Patented Apr. 19, 1910.

Application filed August 25, 1908. Serial No. 450,138.

*To all whom it may concern:*

Be it known that I, CLARENCE WILLIAM MILLSAPS, a citizen of the United States, residing at Millsaps, in the county of Glenn and State of California, have invented certain new and useful Improvements in Feed-Bags for Horses, of which the following is a specification, reference being had therein to the accompanying drawing.

My invention relates to feed bags for horses, and the object thereof is to provide a device of this character which will be automatically controlled by the movement of the horse's head to cause the feed bag to ascend or descend and thus permit the animal to partake of the contents of the bag, and resume his normal posture and thoroughly masticate the food.

Another object contemplated by the invention is the provision of a feed bag having the advantages of lightness, cheapness, and durability of construction.

To the accomplishment of the recited object and others coordinate therewith, the preferred embodiment of the invention resides in that construction and arrangement of parts hereinafter described, illustrated in the accompanying drawings, and embraced within the scope of the appended claims.

In said drawings:—Figure I is a perspective view of the feed bag, showing the relations assumed by the feed bag proper and connections when the horse's head is in a normal position. Fig. II is a similar view of the feed bag and appurtenances showing the relations assumed by the constituent parts of the invention subsequent to the lowering of the horse's head, and Fig. III is a vertical sectional elevation of the device.

Similar numerals of reference designate corresponding parts throughout the several views.

The feed bag proper comprises, preferably, a cylindrical shaped receptacle (1) constructed of leather, metal, or any other suitable material and is provided adjacent the bottom thereof with diametrically oppositely disposed plates (2) having ventilating perforations (3) therein. About the periphery of the upper edge of the feed bag (1) I rivet, or otherwise secure, thereto a reinforcing strip (4) on opposite sides of which are attached, as at (5), upstanding arcuate shaped straddling or bridging members (6) having fastened medially thereof and extending vertically for a short distance the extremital portions of the strap (7), which is connected to the hame in the manner to be hereinafter described. Supports for the strap (7) are provided on opposite sides of the head stall (8) as at (9) the said supports being sufficiently large to permit the free and uninterrupted movement of the strap. The proximal ends of the head stall are guided in their movements by the outstanding loops or brackets 10 which are secured in a rigid manner to the reinforcing strip (4), the distal ends of the head stall being enlarged as at (11), to present a substantially triangular shaped member. The brow band (12) is secured to the head stall (8) in any suitable manner and projects laterally therefrom.

It will be seen that the members 6 straddle the loops or brackets 10 and that the head-stall straps 8 extend down on the inside of the upper portion of the same and through the arch thereof to and through the loops or brackets. This arrangement affords substantial guides for the movements of said head-stall straps, and also assures the receptacle being properly balanced by the members 6, and as said members are connected at two points to said receptacle on opposite sides of the loops or brackets, there is little or no danger of the receptacle becoming detached from the supports.

In the application of the device the strap (7) is placed about the upper terminals of the hame, the head stall and the brow band being connected about the head and nose of the horse in an obvious manner. Simultaneously with the lowering of the animal's head the supports (9) will slide downwardly on the strap (7), and the proximal portions of the head stall (8) will move freely through the loops or brackets (10), the feed bag will ascend, whereupon the horse may partake freely of the contents. When the animal's head is raised, the feed bag will remain in the same position, the connections undergoing a reverse operation and being limited or stopped in this direction by the base portion of the member (11). It will thus be seen that the movements of the feed bag are commensurate with the movements of the horse's head and that this relation is automatically controlled and requires no manual adjustment after the device has been once applied to the horse.

A prominent and distinctive feature of the invention is in the type of head-stall strap employed. It will be readily seen that the same is composed of a single length of strap material which may be formed by one operation of a punching machine to provide the enlarged ends 11, thereby greatly cheapening the device.

It should be understood that in its broader aspect the invention comprehends the employment not only of the various means described, but of equivalent means for performing the recited functions. While the arrangement shown is thought, at the present time, to be preferable, it is desired to reserve the right to effect such modifications and variations thereof as may come fairly within the scope of the appended claims.

Having thus described my invention, what is claimed as new, is:—

1. In a device of the character described, the combination with a receptacle, of a pair of horizontal angle brackets secured at their ends to the upper edge of the receptacle, inverted substantially U-shaped supporting and guiding straps positioned over the brackets and fixedly secured, at their ends, to the receptacle contiguous to the ends of the bracket, a flexible strap head-stall slidably mounted between said brackets and the receptacle and provided with integral, arrow head-shaped ends, said ends adapted to limit the upward movement of the head-stall through said angle-brackets, supports secured to the head-stall, and a hame strap slidably mounted in said supports and having its ends fixedly secured to the substantially U-shaped supporting and guiding straps intermediate their ends and directly above the brackets.

2. As a new article of manufacture, a feed-bag, comprising a receptacle provided with an upper reinforced edge, a pair of horizontal guiding brackets fixedly secured to the reinforced edge, said brackets being arranged on diametrically opposite sides of the receptacle, a supporting strap straddling each of the guiding brackets and having its ends fixedly secured to the reinforced edge contiguous to the ends of the bracket, a head-stall positioned between the supporting straps and threaded through the guiding brackets and terminating at its ends in integral enlarged portions, said enlarged portions limiting the upward movement of the head-stall upon the brackets, supports fixedly secured to the head-stall above the supporting straps, and a hame strap threaded through the supports and fixedly secured at its ends to the supporting straps above the guiding brackets and contiguous to and at one side of the head-stall.

3. A feed-bag comprising a receptacle provided at its upper edge with a pair of inverted substantially U-shaped straps, a bracket secured to the receptacle under each strap and between its ends, a head-stall slidably mounted between the receptacle and the brackets and between the straps, the head-stall provided with integral means for limiting the upward movement of the head-stall upon the brackets, hame strap receiving supports secured to the head-stall, and a hame strap fastened to the outer face of the substantially U-shaped straps above the brackets, and contiguous to the outer face of the head-stall.

4. A feed-bag comprising a receptacle provided at its upper end with a pair of supporting straps, each strap having its ends engaging the receptacle, guiding means secured to the receptacle between the ends of each strap, a sliding head-stall formed from a flat piece of material and provided with flat, integral, enlarged ends adapted to engage the guiding means for limiting movement of the head-stall thereon, supports secured to the head-stall, and a hame strap slidably mounted upon said supports and secured, at its ends, to the outer faces of the straps directly above the guiding means and said head-stall positioned between the straps and slidably engaging the inner faces of the same contiguous to the opposite portions of the straps engaged by the hame strap.

In testimony whereof I hereunto affix my signature in presence of two witnesses.

CLARENCE WILLIAM MILLSAPS.

Witnesses:
LAFE E. MANN,
M. A. HAYWARD.